Patented Jan. 8, 1929.

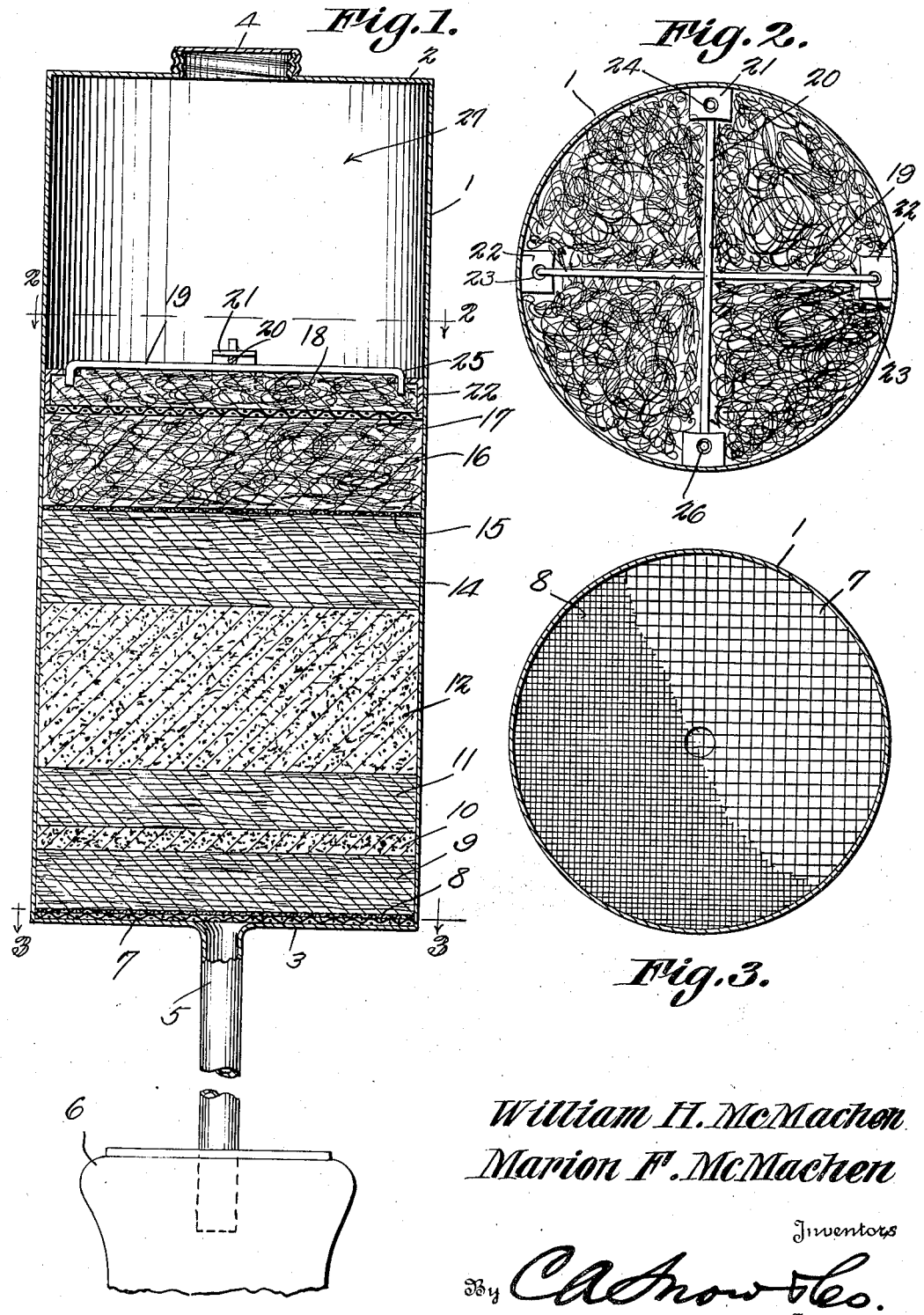

1,698,600

UNITED STATES PATENT OFFICE.

WILLIAM H. McMACHEN AND MARION F. McMACHEN, OF SUPERIOR, WISCONSIN.

OIL PURIFIER.

Application filed December 29, 1927. Serial No. 243,340.

This invention aims to provide a simple means whereby oil drawn from the crank case of an internal combustion engine, may be filtered, purified, and rendered fit for further use as a lubricant.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in longitudinal section, a device constructed in accordance with the invention, parts being in elevation;

Figure 2 is a cross section on the line 2—2 of Figure 1;

Figure 3 is a cross section on the line 3—3 of Figure 1.

In carrying out the invention, there is provided a tubular receptacle 1, which is vertically disposed, the receptacle 1 preferably being made of metal, and including a top 2 and a bottom 3, the top 2 having a removable closure 4, such as a screw cap. The bottom 3 is supplied with an outlet spout 5 through which the filtered oil is discharged into any suitable receptacle shown at 6 in Figure 1.

On the bottom 3 of the receptacle 1 rests a coarse supporting screen 7, which may be made of metal. The screen 7 may be constructed of wire netting, if desired, and upon the screen 7 rests another screen 8, likewise made of metal, the screen 8 being of finer mesh than the screen 7. On the screen 8 is placed a layer of porous material, such as cotton felt, and on the layer of felt, indicated at 9, there is placed a thinner layer of purifying compound, shown at 10. On the layer 10 is placed a layer of porous material, such as cotton felt, shown at 11, the layers at 9 and 11 being of approximately the same thickness. On the layer 11 is placed a mass of purifying compound, shown at 12, the layer indicated at 12 being considerably thicker than the other layers of filtering material hereinbefore and hereinafter alluded to. A layer of cotton felt, or other porous material, as shown at 14, rests on the layer 12 of purifying compound. On the layer 14 of cotton felt is placed a wire netting screen 15, and above this screen there is a mass of cotton waste, indicated at 16. Upon the cotton waste shown at 16, there is placed a retaining screen 17, which, preferably, is made of wire netting. On the screen 17 is located a quantity of cotton waste or the like, as shown at 18. The cotton waste indicated at 18, is held down securely but without being too much compacted, through the instrumentality of a lower rod 19 and an upper rod 20 extended across the rod 19 at right angles thereto. Brackets 21 and 22 are secured to the receptacle 1. The bracket 22 has openings 23, and the bracket 21 has openings 24. The lower rod 19 has depending fingers received in the openings 23 of the brackets 22, the depending fingers being designated by the numeral 25. The upper rod 20 has upstanding fingers 26 which pass upwardly through the openings 24 in the brackets 21. The rod 19 is placed across the path of material shown at 18, and the depending fingers 25 on the rod 19 are extended downwardly through the openings 23 in the brackets 22. The upper rod 20 is placed across the lower rod 19, and the rod 20 is sprung downwardly at its ends, so that the upstanding fingers 26 at the ends of the rod 20 may be engaged upwardly through the openings 24 in the brackets 21. The rods 19 and 20 have resiliency enough so that the rods may be interengaged with the respective brackets in the way above described. The general construction that the mass of material shown at 18 will be held in place but will not be too tightly pressed down. The mass of material shown at 18, being somewhat loose, permits the rapid passage of the oil at the start, and removes the grosser impurities. The oil, then, works its way downwardly through the several layers and through the screens, the oil ultimately emerging from the spout 5 in a clean condition, and capable of further use as a lubricant.

The crossed rods 20 and 19 hold down the filtering material and space the same from the inlet 4 to form a chamber 27 of considerable size, in which the oil may be placed for filtering. The oil works its way slowly down and out through the spout 5, oil being added to the chamber 27 as the oil is depleted when the oil filters away.

The purifying compound shown at 10 and at 12 preferably is composed of a mixture of cotton felt and fuller's earth.

What is claimed is:—

In a device of the class described, a receptacle having an outlet, pairs of brackets within the receptacle, and having openings, a lower rod and an upper rod disposed in crossed relation within the receptacle, the lower rod having depending fingers received detachably in the openings of the brackets of one pair, the upper rod having upwardly extended fingers engaged in the openings of the brackets of the other pair, and filtering material interposed between the rods on the one hand and the outlet on the other hand and held in place by the rods.

In testimony that we claim the foregoing as our own, we have hereto affixed our signatures.

WILLIAM H. McMACHEN.
MARION F. McMACHEN.